United States Patent [19]
Wettlaufer et al.

[11] Patent Number: 6,123,018
[45] Date of Patent: Sep. 26, 2000

[54] METHOD AND APPARATUS FOR EXTRACTING LIQUID FROM A LIQUID-CONTAINING SLURRY

[76] Inventors: Dale E. Wettlaufer, 842 Oakwood; Richard S. Hess, 531 Girard, both of East Aurora, N.Y. 14052

[21] Appl. No.: 09/068,820

[22] PCT Filed: Nov. 14, 1996

[86] PCT No.: PCT/US96/18081

§ 371 Date: May 14, 1998

§ 102(e) Date: May 14, 1998

[87] PCT Pub. No.: WO97/18080

PCT Pub. Date: May 22, 1997

Related U.S. Application Data

[60] Provisional application No. 60/006,727, Nov. 14, 1995.

[51] Int. Cl.[7] ......................................................... B30B 9/06
[52] U.S. Cl. .................. 100/37; 100/45; 100/112; 100/126; 100/185
[58] Field of Search ................... 100/37, 45, 49, 100/110, 112, 126–129, 185, 193, 207

[56] References Cited

U.S. PATENT DOCUMENTS

| | | |
|---|---|---|
| 838,841 | 12/1906 | Carlson ................................. 100/127 |
| 1,971,546 | 8/1934 | Tuttle . |
| 2,063,367 | 12/1936 | De La Roza, Sr. ........................ 100/37 |
| 5,263,411 | 11/1993 | Gourdol . |
| 5,275,097 | 1/1994 | Wettlaufer . |
| 5,307,739 | 5/1994 | Gourdol . |
| 5,365,838 | 11/1994 | Valentini . |

FOREIGN PATENT DOCUMENTS

| | | |
|---|---|---|
| 2 119 670 | 11/1983 | Germany . |
| 358202 | 4/1938 | Italy ....................................... 100/185 |

*Primary Examiner*—Stephen F. Gerrity
*Attorney, Agent, or Firm*—John C. Thompson

[57] ABSTRACT

A method and apparatus for extracting liquid from a liquid-containing slurry. In the preferred embodiment, the apparatus (10) includes a plurality of interconnected press assemblies (12), the outlet (82) of one press assembly (12) being connected to the inlet (92) of a successive press assembly (12). Each press assembly has a foraminous cylindrical container (14), and a two-part piston assembly (18) movable between extended and retracted positions within the foraminous container (14). During operation, a pump (90) continuously feeds slurry under pressure through the inlet of the first press assembly to cause liquid within the first stage slurry upstream of the two-part piston assembly (18) to be radially expressed through the foraminous container (14). After a suitable amount of liquid has been extracted from the first stage slurry, batch processing of the partially dewatered slurry will commence.

25 Claims, 9 Drawing Sheets

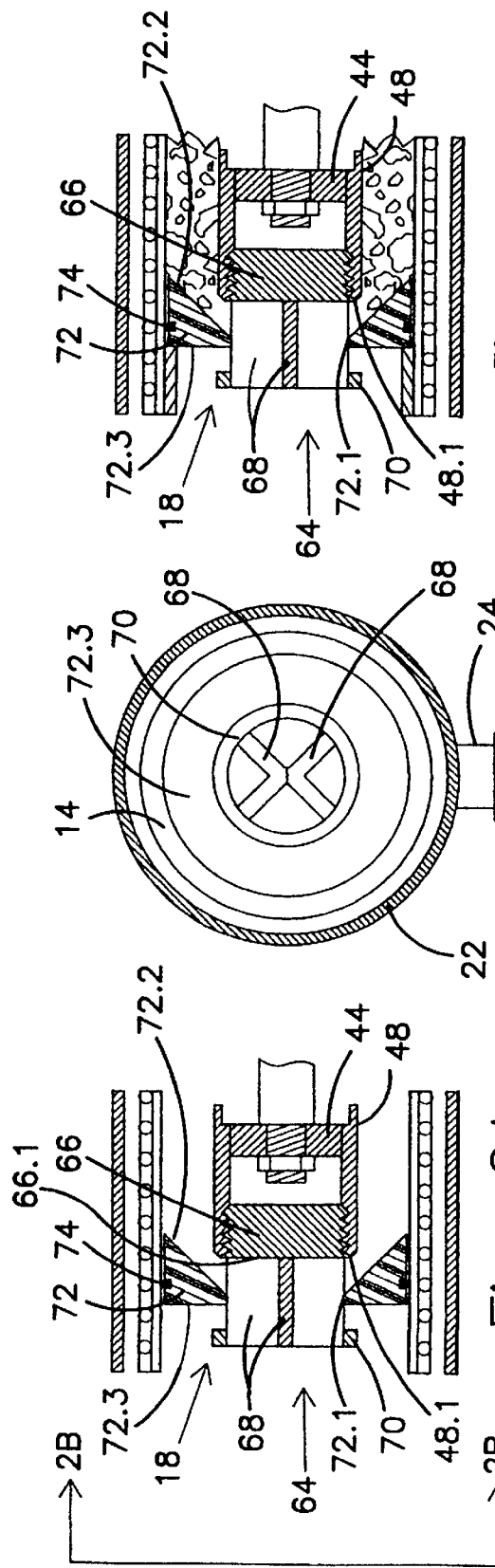
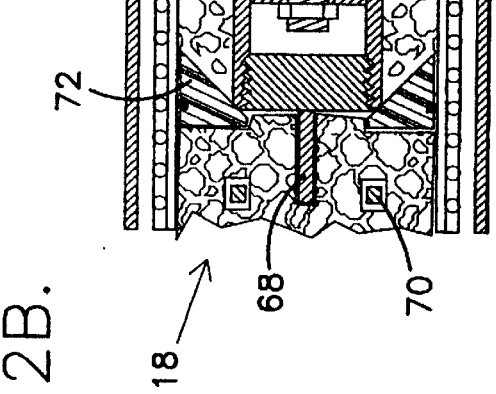
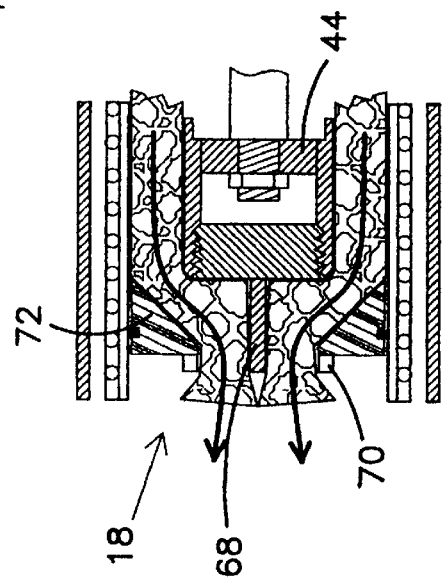

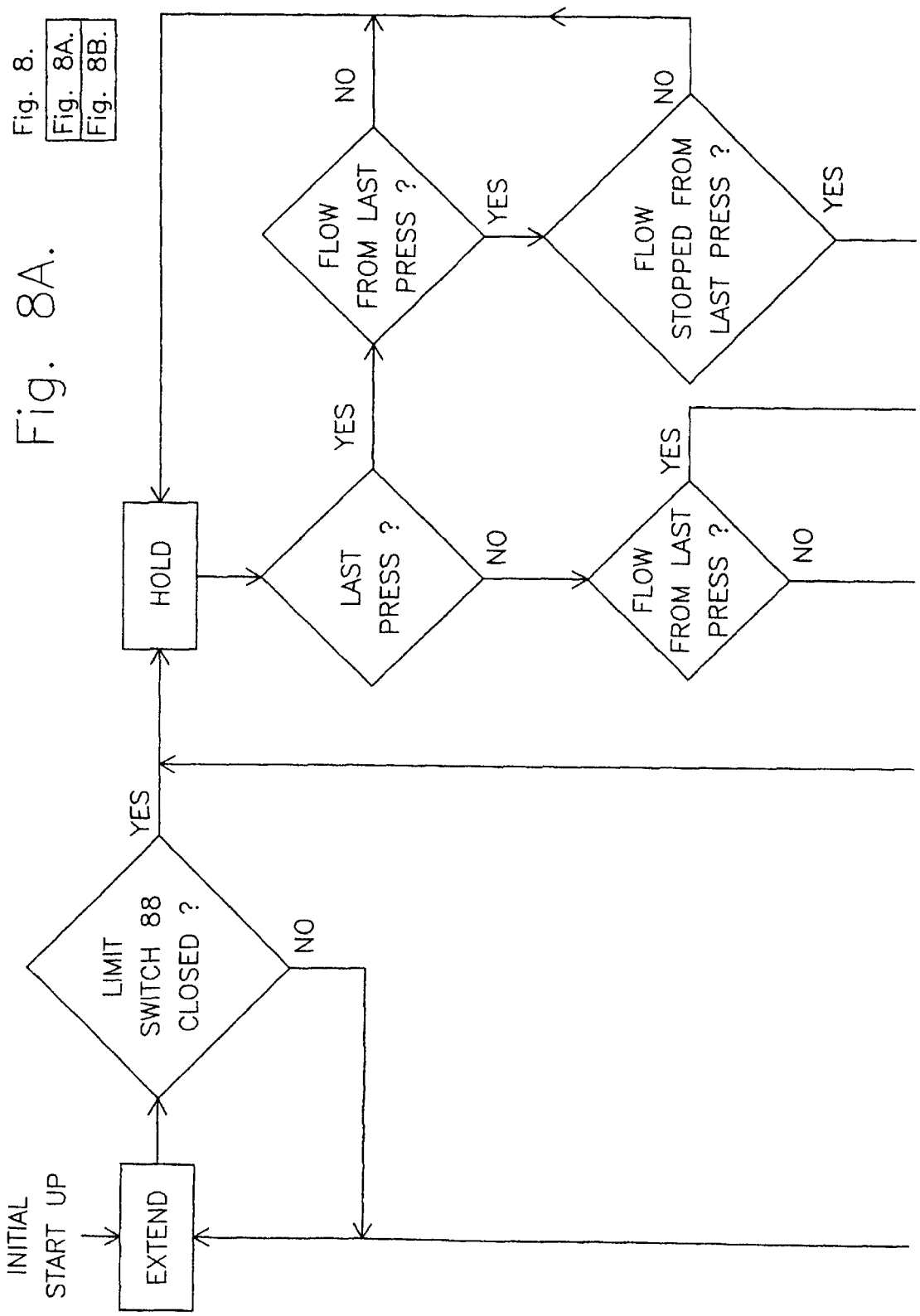

METHOD AND APPARATUS FOR EXTRACTING LIQUID FROM A LIQUID-CONTAINING SLURRY

This appln is a International 371 of PCT/US96/18081 filed Nov. 14, 1996 and also claims the benefit of US/Provisional No. 60/006,727, filed Nov. 14, 1995.

TECHNICAL FIELD

A method for extracting liquid from a liquid-containing slurry, and the apparatus for performing the above method; the apparatus including at least one press assembly having a foraminous cylindrical container provided with an inlet and an outlet, mixing and pressing means mounted for movement within the foraminous container for batch processing slurry by sequentially mixing and pressing the slurry within the foraminous container, and feed means for continuously feeding slurry under pressure through the inlet to cause liquid within the slurry to be expressed through the foraminous container.

BACKGROUND OF THE INVENTION

Apparatuses are well known in the art for separating liquids from slurries. For example, juice presses for separating juice from a fruit are known and examples are shown in U.S. Pat. Nos. 1,971,546; 5,275,097; and 5,365,838. While apparatus for separating juice from fruit was developed in Biblical times, more recently such apparatus has been used in other industries. For example, it is well known in the art that sewage sludge may be dewatered. (In this application, the removal of liquid from a slurry may be referred to a dewatering.) Examples of sewage dewatering apparatus are shown in U.S. Pat. Nos. 5,263,411; 5,307,739; and British 2 119 670 A. A review of these prior patents, as well as many others, shows that problems exist in the art. The product, from which liquid has been extracted, may be referred to as cake. The cake is dropped or otherwise discharged into a bin or other receiving device. If one needs to further extract liquid, the cake must be broken up and conveyed or forced into another apparatus. This is often impossible, or at best difficult.

In single stage batch presses such as the piston presses shown in U.S. Pat. Nos. 5,275,079 and 5,307,729; many products compact so densely that they seal off all exit paths for the escaping liquid. Also, in these designs, it is necessary to clean the filtering media usually at the end of each press cycle. This is done by vibrators, shakers, scrapers, etc. These vibrators, shakers and scrapers are also used to discharge the filter cake from the press as a filter cake frequently sticks badly in batch presses.

A further disadvantage of piston presses such as the type shown in '739 is that it is necessary to provide a valve downstream of the piston to maintain the slurry which is being pressed within the cylinder. As the literature indicates, it is necessary to provide a valve capable of withstanding high pressures and frequently the cost of the downstream valve equals or exceeds the cost of the rest of the apparatus. Continuous presses are also known which apply progressively higher pressures. Examples are shown in U.S. Pat. Nos. 1,971,546; 5,365,838; and GB 2 119 670 A. The auger-type devices shown in '546 and '670 cannot apply a relatively high pressure on the slurry. In addition, auger presses do not aggressively mix the slurry for opening up new passageways for the discharge of material. The '838 reference discloses in FIG. 2 a liquid extracting apparatus which applies progressively higher pressures to a slurry as it is moved away from the inlet on a continuous belt. This design is also defective in that it does not aggressively mix the slurry as it moves from one pressing station to the next for opening up new passageways for the discharge of the material. Also, during the continuous operation, the filter conveyor can clog, and it is not possible to clean the filtering media until the final pressing stage has been accomplished.

It is possible to get more liquid out of a slurry by squeezing it a bit, breaking up the initial cake formed after the initial squeeze, squeezing again, etc. Several presses work on this principle. Two noteworthy examples are the horizontal basket presses of Bucher Guyer in Switzerland, and the pneumatic tank presses of Wilmes in Germany. These presses do the entire dewatering process with the body of the press itself, the problem being the wasted time and effort associated with tying up a relatively large machine during the final stages of pressing, during which time a relatively small quantity of liquid is being expressed.

It is perceived by the present inventors that the product should be removed from the press and transferred to another machine so that the primary presser may be kept employed upon fresh slurry. The secondary presser may be much smaller than the first, as the volume or slurry is greatly reduced when the bulk of liquid is removed in the initial press.

OBJECTS AND SUMMARY OF THE INVENTION

It is an object of the present invention to provide two or more serially arranged slurry presses for extracting liquid from slurry wherein there is a quick and efficient transfer of slurry from one press to another.

It is a further object of the present invention to provide a self-cleaning piston press assembly.

It is an additional object of the present invention to provide a new apparatus and method for extracting liquid from a liquid containing-slurry, which includes a valveless piston press assembly, the press assembly including a foraminous cylinder having an inlet and an outlet, and a piston assembly moveable within the foraminous container and having open and closed positions, which piston assembly may act as a valve.

It is yet another object of the present invention to provide a piston press assembly for extracting liquid from a liquid containing slurry, the press assembly including a two-part piston assembly mounted within a foraminous cylindrical container having an inlet and an outlet, which two-part piston assembly when moved towards the inlet will open up to permit slurry to pass through, which slurry is broken and mixed as it passes through, the two-part piston assembly when moved towards the outlet pressing the broken-up and mixed slurry to cause further liquid to be radially expressed through the foraminous container, and the second stage dewatered slurry to be forced through the outlet.

It is a still further object of the present invention to provide method and apparatus which continually presses first stage slurry, and batch presses successive stages of slurry, the apparatus including feed means for continuously feeding slurry under pressure through the inlet of a first foraminous container to cause liquid within the slurry upstream of a mixing and pressing means to be expressed through the foraminous container, the mixing and pressing means including a two-part piston assembly which is moved within the foraminous container for batch processing the slurry by breaking it up and mixing it as the two-part piston assembly is moved in a first direction and for subsequently pressing the broken-up and mixed slurry to cause further liquid to be radially expressed through the foraminous container.

The above objects, as well as other objects of the present invention are obtained by providing a plurality of interconnected press assemblies, each having a foraminous cylindrical container, the outlet and inlet of successive containers being connected so that slurry will flow from the first container to the last container, each of the containers having mixing and pressing apparatus mounted therein, and there being feed means for initially introducing slurry under pressure into the foraminous container of the first press assembly. With this design two-stage dewatering takes place in the first press assembly and additional dewatering takes place in each succeeding press assembly at progressively higher pressures, with the material being aggressively mixed within each foraminous container and as it passes from one foraminous container to the next. The mixing and pressing apparatus within each foraminous cylinder is able to pump or otherwise force the dewatered mass into a pipe or other device after dewatering is finished. As these press assemblies each are self-cleaning, it can be appreciated that each press assembly arranged in series can discharge automatically and clean its filter element at the same time.

While the foregoing design can extract nearly all of the liquid from a liquid-containing slurry, there are practical limitations on the size of the diameter of the foraminous cylinder. Thus, as each of the mixing and pressing devices during pressing exerts its own force, it also exerts the force of all upstream pressing devices plus the force of the initial feed means. Therefore, very substantial forces can be achieved when a series of press assemblies are interconnected. In order to prevent the wall of the foraminous cylinder from becoming distorted, it is therefore necessary to limit its maximum diameter consistent with accepted design practices. However, capacities can be increased by connecting columns of sequentially arranged presses together with the discharges of the first press in each column going into a common manifold, which common manifold in turn feeds the inlet of succeeding presses.

In summary, it can be seen that by utilizing the apparatus briefly outlined above, many of the problems existing in the prior art may be overcome.

BRIEF DESCRIPTION OF THE DRAWINGS

FIG. 2A shows a closeup of the mixing and pressing means in the position shown in FIG. 1.

FIG. 2B shows is a section taken generally along the line 2B—2B in FIG. 2A.

FIG. 2C shows the mixing and pressing means after it has been fully extended towards the outlet causing the mixing and pressing means to become closed so that slurry may be introduced into the foraminous container upstream of the mixing and pressing means.

FIG. 2D shows the mixing and pressing means moving upstream after slurry has been introduced behind it, the movement of the mixing and pressing means causing slurry to be forced through the mixing and pressing means to thoroughly mix it.

FIG. 2E shows the mixing and pressing means moving downstream to press the material downstream of the mixing and pressing means, additional slurry being introduced upstream of the mixing and pressing means.

FIGS. 8, 8A and 8B are flow charts illustrating the operation of the FIGS. 3–5 embodiment.

DETAILED DESCRIPTION

Figure 3:
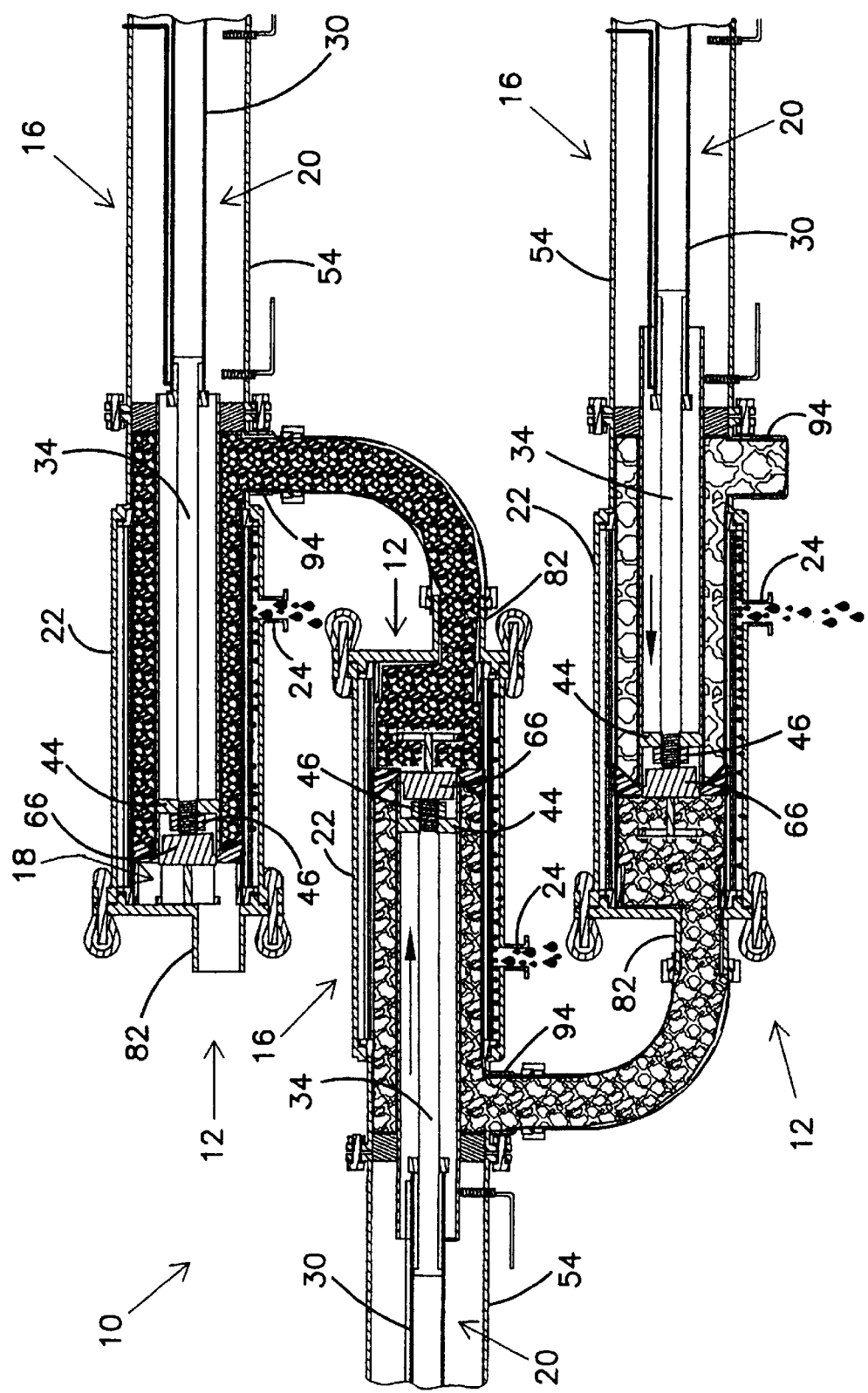
FIG. 3 shows three press assemblies sequentially arranged with the outlet of the first press assembly being connected to the inlet of the second press assembly, and with the outlet of the second press assembly being connected to the inlet of the last press assembly, the mixing and pressing means of the first and second press assemblies being moved in a downstream direction to extract liquid, and the mixing and pressing means of the last press assembly being held in its fully extended closed position.
Figure 4:
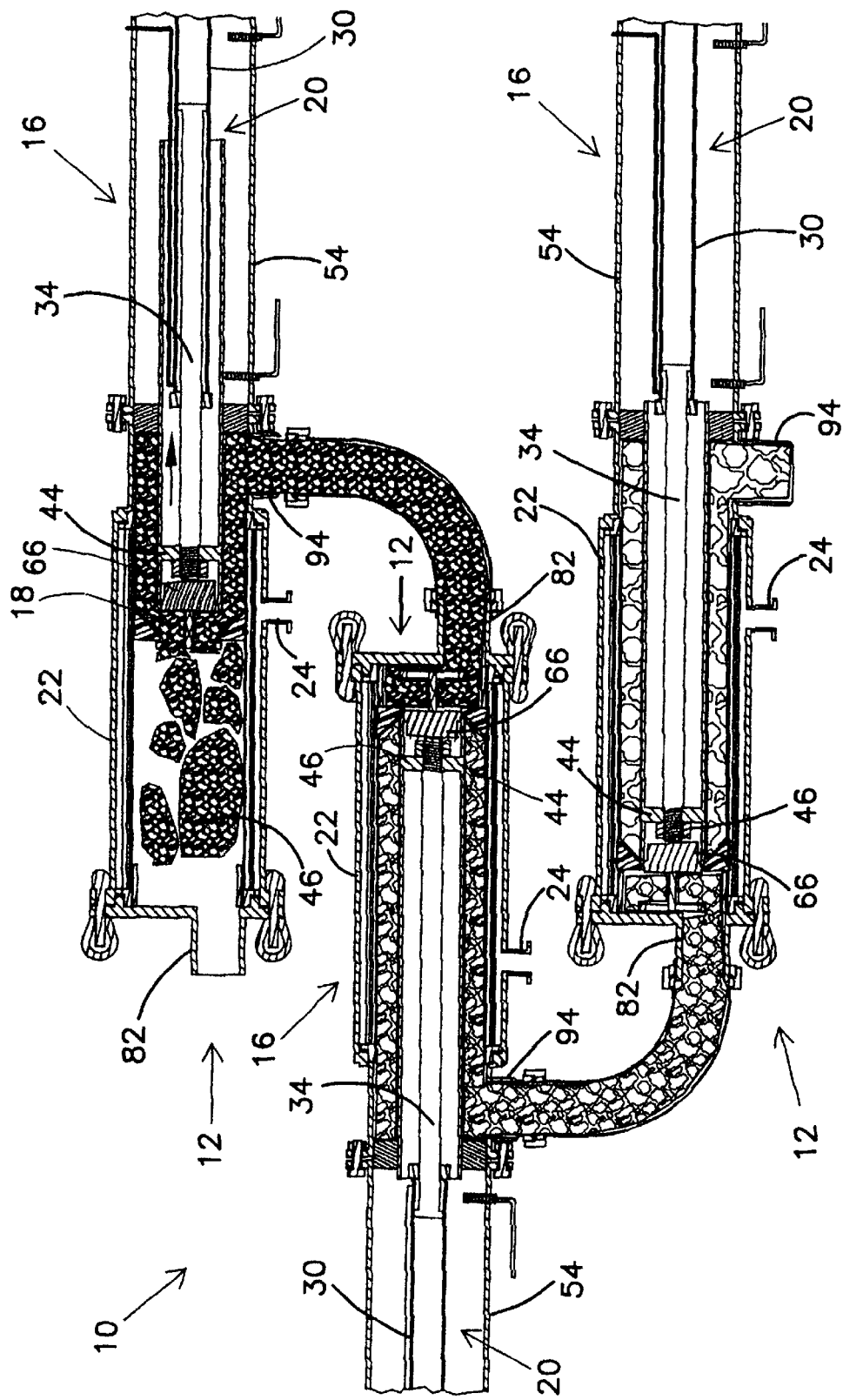
FIG. 4 is a view similar to FIG. 3 and shows the beginning of the expulsion cycle of the last press assembly while the first and second press assemblies are shown in their fully extended positions holding pressure.
Figure 5:
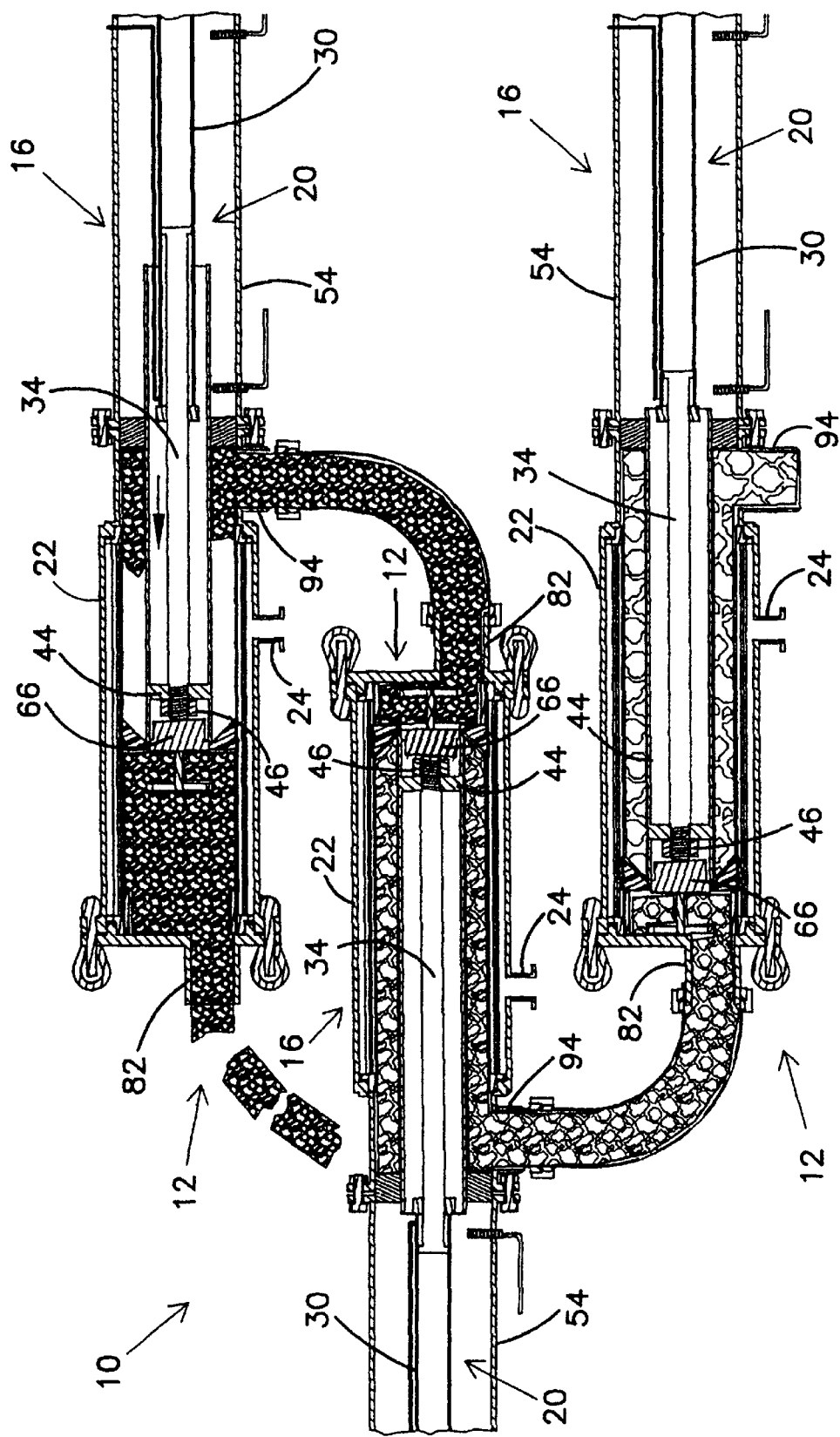
FIG. 5 is a view similar to FIG. 4 but showing the expulsion cycle of the last press assembly near completion.
Figure 6:
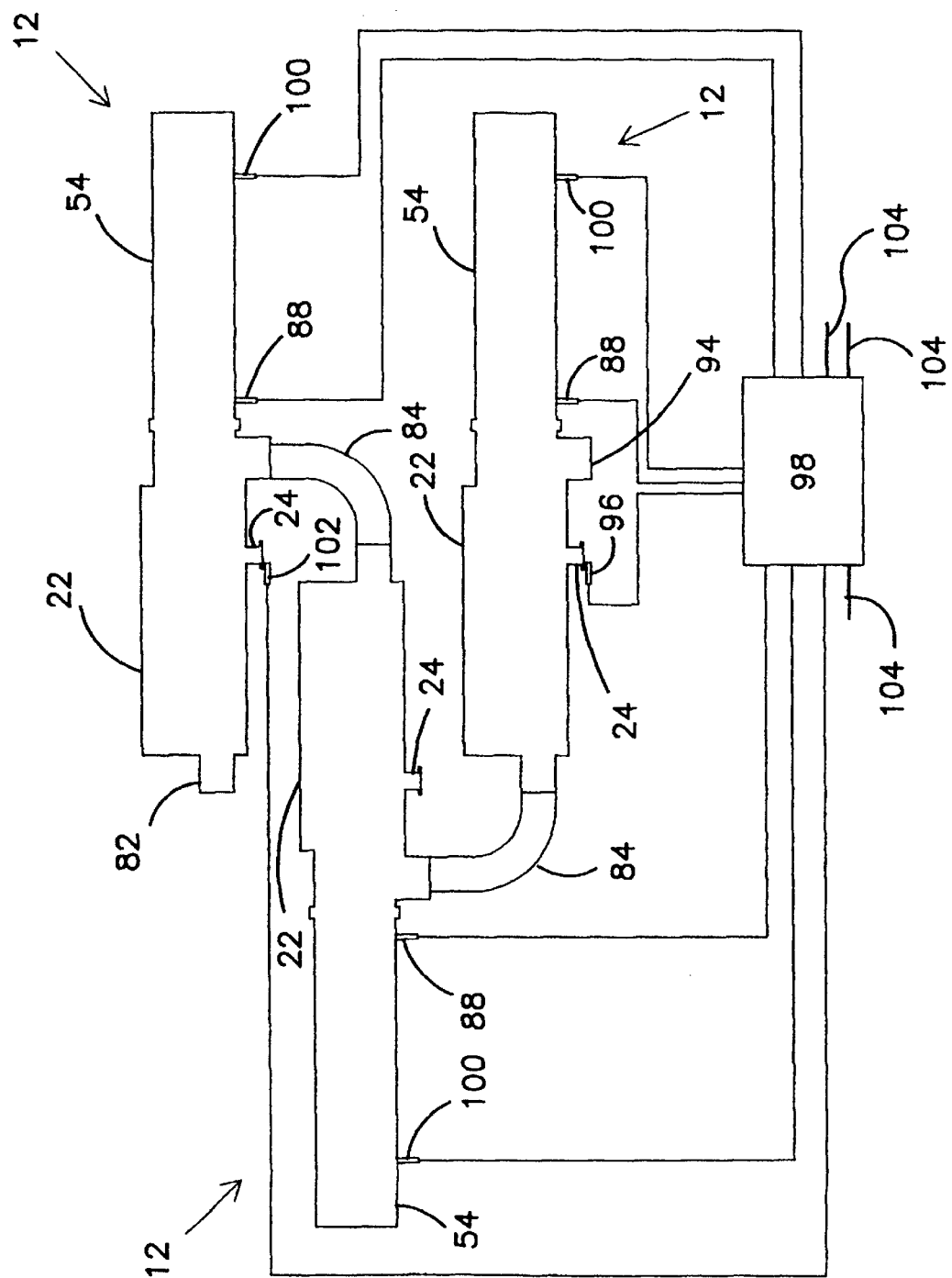
FIG. 6 shows a schematic of the control circuit for the apparatus shown in FIGS. 3–5.
Figure 7:
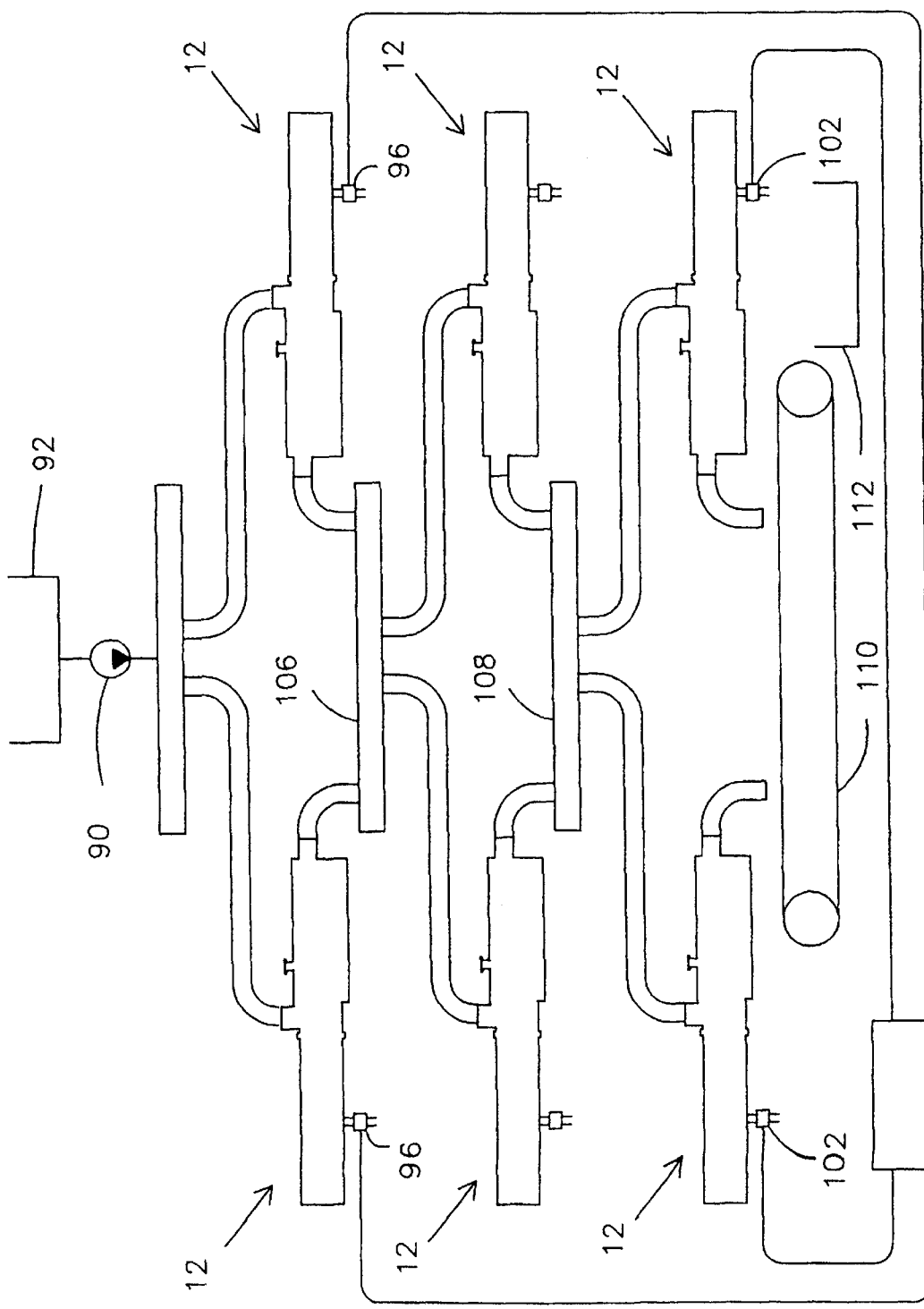
FIG. 7 is a view illustrating how a plurality of series of press assemblies can work together.

The apparatus of this invention is indicated generally at 10 in FIG. 3 and includes at least one press assembly indicated generally at 12. A number of press assemblies may be arranged sequentially as shown in FIGS. 3–5. In addition, a plurality of columns of sequentially-arranged press assemblies may be utilized as indicated in FIG. 7. Each of the press assemblies shown in the various figures is structurally the same, although the controls for the press assemblies may vary. A single press assembly will now be described with reference to FIG. 1.

Each press assembly includes a central foraminous container or filter cylinder 14, and mixing and pressing means, indicated generally at 16. The mixing and pressing means in turn include a two-part piston assembly, indicated generally at 18; and extensible and retractable means, indicated generally at 20. The foraminous cylinder is mounted within an outer housing 22 provided with a liquid outlet 24. The cylinder 14 has a slurry inlet opening 26 at its upstream end, and a compressed slurry outlet 28 at its downstream end, which is to the left in FIG. 1. The filter cylinder is, in the preferred embodiment, constructed of metal screen, in particular "V" or "wedge wire" screen.

The extensible and retractable means 20 preferably consists of a double-acting hydraulic ram assembly including a hydraulic cylinder 30, the anchor end of which is secured to a mount 32. A piston rod 34 extends from the rod end of the hydraulic cylinder 30, the rod being driven by a piston 36 within the hydraulic cylinder 30. Hydraulic lines 38 and 40 are interconnected with cylinder 30 and are controlled via solenoid operated control valves (not shown) to cause the piston or actuator rod 34 to be extended or retracted. The end of the actuator rod which extends outside of the hydraulic cylinder has a reduced diameter threaded end portion 42 which passes through a ring 44, the ring being secured about the threaded end portion 42 by a nut 46. The annular outer surface of the ring 44 is in turn welded or otherwise rigidly secured to the inside of an elongated ran tube 48 which passes through a seal 50 and bearing 52 upstream of the inlet opening 26. The seal and bearing assembly 50, 52, and the mount 32 are both carried by a steel mounting tube 56 which is disposed about the ram tube 48 and the extensible and retractable cylinder means 20.

A cylindrical transition member 56 is rigidly secured by welding or the like to the outer housing 22 adjacent the inlet opening 26. The other end of the transition member 56 has a flange 58. A flange 60 on the mounting tube 54 is secured to the flange 58 by means of bolts 62.

The end of the ram tube 48 which passes through foraminous cylinder 14 receives a welded assembly indicated generally at 64. The welded assembly includes a threaded plug 66, vanes 68, and a ring 70. Plug 66 is screwed into ram tube 48. Vanes 68 are mounted on the face 66.1 of the threaded plug. Ring 70 is supported by the ends of the vanes away from the threaded plug. The face 66.1 of plug 66 and the face 48.1 of ram tube 48 act as an inner piston within cylinder 14. As can best be seen from FIG. 2A, ring 70 has a diameter greater than the effective diameter of the vanes 68. Loosely supported on the vanes 68 between ring 70 and plug 66 is an annular member 72 which acts as an outer piston within cylinder 14. The annular piston 72 has a large circular opening 72.1 of a diameter less than that of ram tube 44.

With reference now to FIGS. 2D and 2E, the end of ram tube 48, plug 66, and annular piston 72 form a two-part piston assembly which is closed when the extensible and retractable means 20 is extended as shown in FIG. 2E, and which is open when the extensible and retractable means is retracted as shown in FIG. 2D. Ring 70 and vanes 68 comprise lost motion connection means, the annular outer piston 72 abutting the face 44.1 of tube 44 when being moved in the downstream direction shown in FIG. 2E.

The annular outer piston 72 has a scraping surface 72.2 so that as the annular piston is moved towards inlet 26, slurry upstream of the annular piston will be scraped away from the surface of foraminous cylinder 14 and forced through the large opening 72.1 of the annular piston. The annular piston is preferably made of a tough plastic, but other suitable materials may be used. In addition, the annular piston has one or more O-rings 74 (only one being illustrated), the function of the O-rings being to rub along the surface of foraminous cylinder 14 as the piston 72 is moved in either direction for the purpose of cleaning the surface of the cylinder. The operation of the two-part piston assembly will be described in greater detail below.

Downstream of the foraminous cylinder and the downstream end of the outer housing is a removable exit door 76 which is held in its assembled position by pivoted bolts 78 and nuts 80. The exit door has an exit opening 82 to which a suitable conduit 84 may be interconnected. Disposed within the foraminous container at the downstream end adjacent the exit door 76 is a stop ring 86, the purpose of which is to act as a closing means for the two-part piston assembly. Thus, it limits the movement of the annular piston 72 as the hydraulic ram is extended to ensure that the two-part piston assembly 18 is closed, closure being necessary during initial start-up.

The operation of a single press assembly 12 will now be described. At the commencement of the first cycle of operation, the two-part piston assembly 18 will be extended all the way towards the discharge, the stop ring 86 closing the two-part piston assembly. After the two-part piston assembly has been fully extended, as sensed by limit switch 88, it will be held in its extended closed position. Thus, limit switch 88 senses the extreme downstream position of the tube 44, switch 88 sensing by infrared light, or by any other conventional manner. The two-part piston assembly closes the press assembly without the use of a separate valve. The operation of external pump 90 is now commenced, and slurry to be dewatered is pumped from reservoir 92 through inlet 94 in transition member 84 and into inlet opening 26 of foraminous cylinder 14. The pump 90, which operates continuously during the operation of the press, is preferably a positive displacement type, such as a gear pump, having a relief discharge pressure set at approximately 30 psi (approximately 207 kPa).

As cylinder 14 fills up, liquid is radially expressed from the slurry through foraminous cylinder 14 and into outer housing 22, such liquid then passing through liquid outlet 24 at the bottom of the housing, and into contact with a flow sensor 96 which senses the flow rate of the liquid being expressed from the slurry. The flow sensor is interconnected with a controller which may be a computer 98. When liquid flow is essentially stopped, hydraulic fluid will be introduced through line 36 to cause piston rod 34 and two-part piston assembly 18 to be quickly retracted.

Initially, during the retraction cycle, the lost motion coupling means 68, 70 will permit the downstream face 72.3 of annular piston 72 to contact ring 70, opening up the two-part piston assembly. After the two-part piston assembly has opened, continued movement of rod 34 in the right-hand direction will cause first-stage dewatered slurry material to be forced through the large circular opening 72.1, thoroughly mixing and breaking up the first-stage dewatered material. This causes great agitation and reforming of the cake or dewatered slurry, thereby opening up new pathways for liquid to escape, among other things. As the annular piston 72 moves, the scraper ring 74 cleans the inside of filter cylinder 14 of particles which can blind the holes of the screen.

The movement of the actuator rod and two-part cylinder assembly will continue until it approaches the inlet opening, at which time limit switch sensor 100 will sense the right-hand position of the tube 48. Information from sensor 100 will be communicated to controller 98, which will in turn cause hydraulic fluid to be introduced into cylinder 30 behind piston 36 to cause actuator rod 34 to move in a downstream direction to the left (in FIG. 1). This will initially cause the face 44.1 of the closed inner piston to contact the annular piston, thereby closing the opening within the two-part piston assembly. As the pressure within cylinder 30 is limited to approximately 30 psi (approximately 207 kPa) the two-part piston assembly will slowly force the material ahead of it, causing second stage slurry in front of the two-part piston assembly to be slowly compresses, extracting additional liquid, and forcing the second stage dewatered slurry through exit opening 82 and conduit 84.

When used as a single-stage press, conduit 84 may act as a restrictor. Alternatively, it may have a valve to ensure that sufficient pressure is exerted upon the mixed material within the foraminous cylinder on the downstream side of the two-part piston to cause further liquid to be extracted within the first foraminous cylinder. During this pressing cycle slurry to the upstream side of the two-part piston assembly will be subjected to a press force by pump 90. Thus, the mixed second-stage material downstream of the two-part piston assembly will be subjected to both pump pressure and ram pressure. It should be appreciated from an inspection of FIG. 1 that the material discharged from press 12 will again be broken up and mixed during this discharge cycle. The foregoing operation will be repeated a number of times until all of the desired slurry has been processed, material to the upstream side of the two-part piston continually being subject to pressure from pump 90. The apparatus just described continuously presses slurry to the upstream side of the two-part piston assembly, and slurry passing through the two-part piston assembly is batch processed by mixing of the initially dewatered slurry as it passes through the circular opening 72.1, and by pressing the mixed material.

After all of the slurry has been processed, it may be desired to clean the apparatus. To this end, nuts 80 are loosened, and the exit door may be removed. The filter cylinder 14, and all of the parts therein, can now be easily removed for cleaning and replacement.

With reference now to FIGS. 3–6, a series of interconnected press assemblies are illustrated, conduits 84 interconnecting the outlet of one container to the inlet of a successive container so that slurry will flow from the first to the last containers. Feed means (not shown) similar to pump means 90 is provided for introducing slurry under pressure into the inlet of the first foraminous container, the pressure also being approximately 30 psi. Flow sensors 96 and 102 (FIG. 6) are also provided to sense the flow of fluid from the first and last foraminous containers, the sensors in turn being interconnected with controller 98. Controller 98 is also interconnected via control lines 104 to suitable solenoid operated valves for controlling the flow of fluid into each of the cylinders 30 via lines 38 and 40.

Figure 8B:
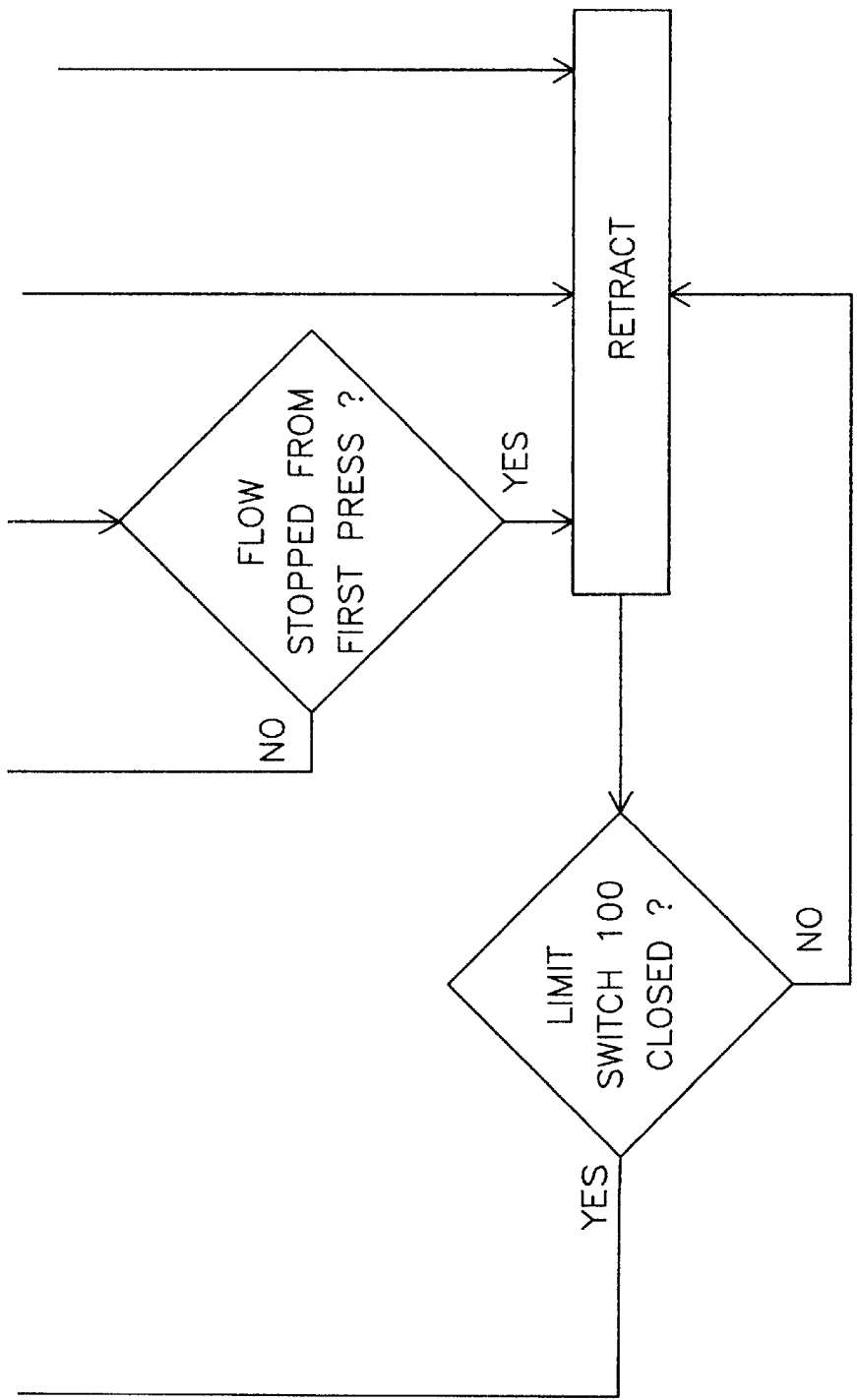

The operation of the interconnected series of pump assemblies can best be understood from the flow chart in FIG. 8. At the commencement of operation, the controller will initially cause the two-part piston assemblies 18 for each of the essentially identical press assemblies to move to the fully extended downstream position where they will close by stop ring 86. After all piston assemblies have attained this position as sensed by limit switches 88, the operation of pump 90 will commence forcing slurry from reservoir 92 into the inlet of the first foraminous cylinder causing liquid to be expressed from the cylinder. During this initial phase the cylinders will be held in 10 their extended position. If no flow has commenced from the outlet of the last press assembly, as sensed by flow sensor 102, as would be the case during start-up, the controller 98 is responsive to the liquid sensor 96. During the initial dewatering cycle, the pump will continue to force material into foraminous cylinder 14 of the first press assembly until flow sensor 96 indicates that there is no more liquid flowing through outlet 24 of housing 22 of the first press assembly.

It is now necessary to start batch processing the material initially received within the first press assembly and this is done by retracting two-part piston assembly 18 of the first press assembly, causing material upstream of the two-part press assembly to be forced through the circular opening 72.1 of the annular piston, thoroughly mixing and breaking up this material. This operation will continue until sensor 100 indicates that the two-part piston assembly is fully retracted. During start-up when no flow has been sensed by flow sensor 102 of the last press assembly, the mixing and pressing means 16 of every press assembly, except for the last one, will operate simultaneously. However, the two-part piston assembly 18 of the last press assembly will be held in its fully extended position.

During continued initial operation, the two-part piston assemblies will continue to extend and retract, the initiation of the retraction step being under the control of flow sensor 96 and the initiation of the extension step being under the control of limit switch 100. During each cycle of operation after the very first cycle of operation, material will be mixed by passing it through the two-part piston assembly during retraction, and will then be pressed again during the subsequent extension step.

Each of the successive pistons operates at successfully higher pressures. Thus, with reference to FIG. 3, the operating pressure for cylinder 30 of the first press assembly, shown at the bottom of the figure, is approximately 30 psi (approximately 207 kPa), the operation of the next successive cylinder assembly is approximately 40 psi (approximately 276 kPa), and the operation for the last cylinder assembly being approximately 50 psi (about 345 kPa).

Once flow is sensed by flow sensor 102, a different sequence of operations commence. Thus, all of the foraminous cylinders have now been filled with material and the third stage material to the upstream side of the two-part piston assembly in the last press assembly is subjected to the total pressure of the pump and the two upstream piston assemblies, causing additional liquid to be extracted from the mixed material within the third foraminous cylinder. After flow is initially sensed by sensor 102, each of the two upstream two-part piston assemblies will now commence to cycle independently in the manner indicated in FIG. 8. Thus, each upstream piston assembly 18 will simply extend until limit switch 88 of the respective press assembly senses the fully extended position, at which time the two-part piston will be quickly retracted until its fully retracted position is sensed by the limit switch 100 of the respective press assembly. Meanwhile, during this batch processing of partially dewatered slurry, the pump continues to operate constantly forcing slurry under pressure into the first foraminous cylinder upstream of the first two-part assembly.

Once the flow of liquid is no longer sensed by flow sensor 102, the two-part piston assembly of the last press assembly will be quickly retracted as indicated in FIG. 4, regardless of the position of the upstream piston assemblies. After this retraction step, the piston of the last cylinder assembly will then be extended forcing the final stage dewatered slurry out of the foraminous cylinder until the last two-part piston assembly is closed by stop ring 86 of the last press assembly. The last piston will act as a valve for all upstage press assemblies.

The operation of the press assemblies described above will continue until all slurry material has been exhausted from reservoir 92, and until no more liquid is sensed by flow sensor 102. At this time, the exit doors of the various press assemblies can be opened up for final cleaning.

Figure 1:
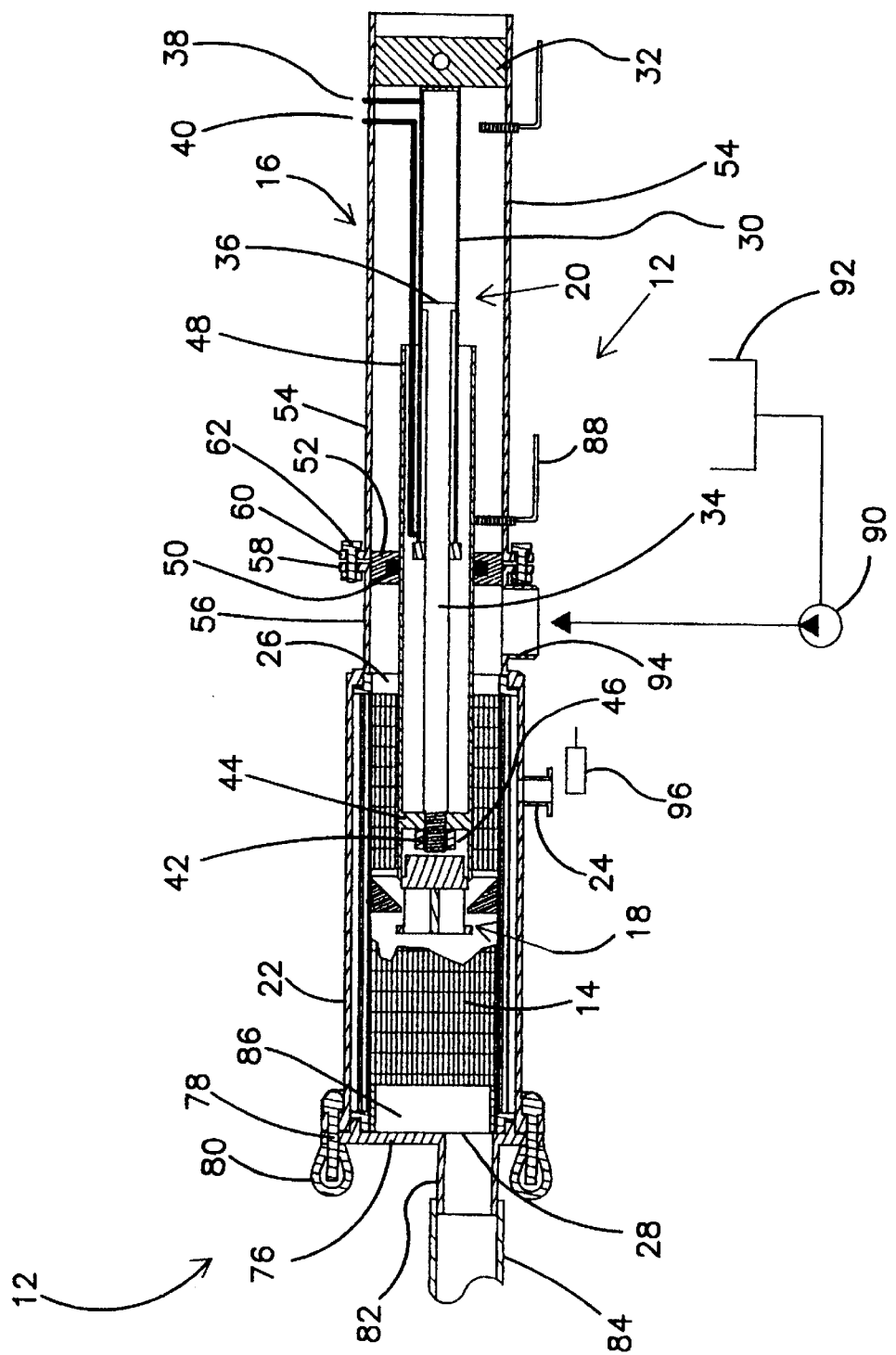
FIG. 1 shows a cross-sectional view of a press assembly of this invention, the press assembly including a cylindrical foraminous container having an inlet and an outlet, the outlet being shown to the left, and includes mixing and pressing means which are shown in an intermediate position before slurry has been introduced into the press assembly.

While the press assemblies, like that shown in FIG. 1, may be used in a series of three interconnected presses as shown in FIGS. 3–6, they may also be used in a series of two, or in longer series. In additions series presses may be mounted in parallel as shown in FIG. 7, which shows two parallel sets of three stage series presses with the outlet of the first press assembly of each series being connected to a common manifold 106, and the outlet for the second press assembly in each of the series being connect to a further common manifold 108. The outlet of the last press in each series may discharge the compacted and dewatered slurry onto a conveyor belt 110 for discharge into a suitable receptacle 112. The various presses shown in FIG. 7 will be controlled in a manner similar to that previously described except that the two-part piston assembly for each press which discharges into a common manifold (such as 106 or 108) will be extended at the same time to prevent backflow from the manifold into a preceding press.

Individual press assemblies can be connected together in series, in parallel, or both to extract liquid from slurry. This form of press assembly, particularly when used in series, does not require an expensive valve as used in prior art single stage press assemblies. By continuously extracting liquid from the initially introduced slurry, and batch processing the slurry after the initial slurry has been dewatered, improved liquid extraction is achieved with no manual processing.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims.

What is claimed is:

1. A method for extracting liquid from a liquid containing slurry comprising the following steps:

providing a first foraminous container (14) having an inlet (26) and an outlet (28) and mixing and pressing means (16) mounted within the container (14) for movement between the inlet (26) and the outlet (28);

continuously feeding liquid containing slurry under pressure through the inlet (26) into the first foraminous container (14) upstream of the mixing and pressing means (16), the pressure being sufficient to cause an initial volume of liquid within the slurry upstream of the mixing and pressing means (16) to be extracted; and batch processing the slurry after it has been fed into the first foraminous container (14) by mixing the slurry in the first foraminous container (14) by moving it through the mixing and pressing means (16) after the initial volume of liquid has been extracted, and by subsequently pressing the mixed slurry in the first foraminous container (14) downstream of the mixing and pressing means (16) to cause a further volume of the liquid from within the slurry to be extracted.

2. A method for extracting liquid from a liquid containing slurry comprising the following steps:

providing a first foraminous container (14) having an inlet (26) and an outlet (28) and mixing and pressing means (16) mounted within the container (14) for movement between the inlet (26) and the outlet (28);

feeding liquid containing slurry under pressure through the inlet (26) into the first foraminous container (14) upstream of the mixing and pressing means (16) to cause an initial volume of liquid within the slurry upstream of the mixing and pressing means (16) to be extracted;

mixing the slurry in the first foraminous container (14) by moving it through the mixing and pressing means (16) after the initial volume of liquid has been extracted; and subsequently pressing the mixed slurry in the first foraminous container (14) downstream of the mixing and pressing means (16) to cause a further volume of the liquid from within the slurry to be extracted.

3. The method of extracting liquid from liquid containing slurry as set forth in claim 2 comprising the following additional step of:

cleaning the foraminous container (14) while the slurry is being mixed.

4. The method of extracting liquid from liquid containing slurry as set forth in claim 2 comprising the following additional step of:

feeding further liquid containing slurry under pressure into the first foraminous container (14) after the initial volume of liquid has been extracted to cause a further volume of liquid within the further slurry to be extracted.

5. The method of extracting liquid from liquid containing slurry as set forth in claim 4 wherein the further liquid containing slurry is forced into the first foraminous container (14) at the same time the mixed slurry is being pressed by the mixing and pressing means (16).

6. The method of extracting liquid from liquid containing slurry as set forth in claim 4 comprising the following additional step of:

providing a second foraminous container (14) having an inlet (26) and an outlet (28) and a mixing and pressing means (16) between the inlet (26) and the outlet (28), the inlet (26) of the second foraminous container (14) being connected to the outlet (28) of the first foraminous container (14); and wherein the step of subsequently pressing the mixed slurry in the first foraminous container (14) will cause at least a portion of the mixed slurry to be forced from the outlet (28) of the first foraminous container (14) into inlet (26) of the second foraminous container (14) with additional liquid being extracted in the second foraminous container (14).

7. The method of extracting liquid from liquid containing slurry as set forth in claim 6 comprising the following additional steps of:

mixing the of slurry in the first and second foraminous containers (14); and subsequently pressing the mixed slurry in the first and second foraminous containers (14) to cause a still further volume of the liquid to be extracted.

8. The method of extracting liquid from liquid containing slurry as set forth in claim 2 comprising the following additional steps of:

providing a plurality of additional sequentially arranged foraminous containers (14) including a last container (14), each of the additional foraminous containers (14) having an inlet (26), an outlet (28), and a mixing and pressing means (16) mounted for movement through the container (14), the outlet (28) and inlet (26) of successive containers (14) being connected together so that slurry will flow from the first to the last container (14);

wherein the step of subsequently pressing the mixed slurry in the first foraminous container (14) will cause additional liquid from within the mixed slurry to be extracted and to also cause at least a portion of the mixed slurry to be forced through the sequentially arranged foraminous containers (14), the mixing and pressing means (16) in the last foraminous container (14) acting as a discharge valve for the first foraminous container (14); and mixing the mixed slurry in the foraminous containers (14) subsequent to the first foraminous container (14).

9. A method for extracting liquid from a liquid containing slurry comprising the following steps:

a) providing a plurality of sequentially arranged foraminous containers (14) including first and last containers (14), each container (14) having an inlet (26) and an outlet (28), and mixing and pressing means (16) mounted for movement between the inlet (26) and the outlet (28) of the container (14), the outlet (28) and inlet (26) of successive containers (14) being connected together so that slurry will flow through the first to the last container (14);

b) initially feeding liquid containing slurry under pressure through the inlet (26) into the first foraminous container (14) upstream of the mixing and pressing means (16) to cause an initial volume of the liquid within the slurry upstream of the mixing and pressing means (16) to be extracted;

c) mixing the slurry in the first foraminous container (14) after the initial volume of liquid has been extracted by moving it through the mixing and pressing means (16);

d) subsequently feeding additional liquid containing slurry under pressure into the first foraminous container (14) to cause additional volumes of liquid within the slurry to be extracted upstream of the mixing and pressing means (16);

e) pressing simultaneously with step d) the preceding mixed slurry in the foraminous containers (14) to cause additional liquid from within the mixed slurry to be extracted and to also cause at least a portion of the mixed slurry to be forced through the sequentially arranged foraminous containers (14);

f) after steps d) and e) are completed, mixing the slurry in the foraminous containers (14); and g) subsequently repeating steps d), e) and f), the mixing and pressing means (16) in the last foraminous container (14) acting as a discharge valve for the first foraminous container (14).

10. Apparatus for extracting liquid from a liquid containing slurry; the apparatus comprising:
- a press assembly (12) having
  - a foraminous container (14) having an inlet (26) and an outlets (28), and
  - mixing and pressing means (16) movable in a first direction towards the inlet (26) to cause slurry between the mixing and pressing means (16) and the inlet (26) to pass through the mixing and pressing means (16) and become mixed, and movable in a second direction to cause slurry between the mixing and pressing means (16) and the outlets (28) to be compressed causing liquid within the slurry to pass through the foraminous container (14); and
- feed means (90) for introducing slurry through the inlet (26).

11. The apparatus as set forth in claim 10 wherein the foraminous container (14) is a cylindrical filter made from wedge wire.

12. The apparatus as set forth in claim 10 wherein the mixing and pressing means (16) has a scraping surface (72.2) so that as the mixing and pressing means (16) moves in the first direction slurry will be scraped away from the interior surface of the container (14).

13. The apparatus as set forth in claim 12 wherein the mixing and pressing means (16) includes a two-part piston assembly (18) including an annular piston (72), the scraping surface (72.2) being formed on the annular piston (72).

14. The apparatus as set forth in claim 10 wherein the feed means (90) introduces slurry into the foraminous container (14) with sufficient pressure so that a volume of the liquid within the slurry will be expressed through the foraminous container (14).

15. The apparatus as set forth in claim 10 wherein the mixing and pressing means (16) includes a two-part piston assembly (18) including an annular outer piston (72) having a circular opening (72.1) of a first diameter, and a closed inner piston having a face (48.1, 66.1) of a second diameter greater than the first diameter of the annular outer piston (72.1) so that when the closed inner piston is moved in the second direction it will abut the annular outer piston and force it in the second direction in such a manner that all slurry downstream of the two-part piston assembly (18) will be compressed.

16. The apparatus as set forth in claim 15 wherein the two-part piston assembly (18) further comprises lost motion connecting means (68, 70) for connecting the annular piston (72) to the closed inner piston (48, 66), the lost motion connecting means being in the form of vanes (68) and a ring retainer (70) positioned downstream of the annular outer piston (72), one end of the vanes (68) being secured to the face (66.1) of the closed inner piston, and the other end of the vanes being connected to the ring retainer, the diameter of the ring retainer being sufficiently large so that it will engage the annular outer piston (72) as it moves in the second direction.

17. The apparatus as set forth in claim 15 wherein the closed inner piston includes a tube (48) having an open first end and a closed second end, the mixing and pressing means (16) further including extensible and retractable means (20) interconnected with the tube.

18. The apparatus as set forth in claim 15 wherein the two-part piston assembly (18) further includes piston closing means (86) for insuring that the two-part piston assembly (18) is closed when the slurry is initially forced into the first foraminous container (14).

19. The apparatus as set forth in claim 18 wherein the piston closing means is a stop ring (86) mounted within the foraminous cylinder adjacent the outlet (28), the stop ring engaging the annular piston (72) and holding it against the closed inner piston (48, 66) when the two part piston is moved adjacent the outlet (28).

20. An apparatus for extracting liquid from a liquid containing slurry, the apparatus comprising:
- a press assembly (12) having
  - a first foraminous container (14) having an inlet (26) and an outlet (28), and
  - mixing and pressing means (16) mounted for movement within the first foraminous container (14) for batch processing slurry within the first foraminous container (14) by sequentially mixing and pressing slurry within the container (14);
- feed means (90) for continuously feeding slurry under pressure through the inlet (26) of the first foraminous container (14) to cause liquid within the slurry to be radially expressed through the first foraminous container (14); and
- flow regulating means (16) downstream of the outlets (28) of the first foraminous container (14) for regulating the flow of slurry through the apparatus.

21. Apparatus for extracting liquid from a liquid containing slurry comprising:
- a plurality of sequentially interconnected press assemblies (12) including a first press assembly (12) and a last press assembly (12), each press assembly (12) having
  - a foraminous container (14) having an inlet (26) and an outlets (28), and
  - mixing and pressing means (16) mounted for movement within the foraminous container (14) for batch processing of slurry within the container (14) by sequentially mixing and pressing slurry within the foraminous container (14);
- conduit means interconnecting the outlets (28) and inlet (26) of successive containers (14) so that slurry will flow from the first to the last container (14); and
- feed means (90) for continuously introducing slurry under pressure through the inlet (26) of the foraminous container (14) of the first press assembly (12) to cause liquid within the slurry to be expressed through the foraminous container (14) of the first press, wherein the mixing and pressing means (16) in the last press assembly (12) regulates the flow of slurry through the apparatus.

22. The apparatus for extracting liquid from a liquid containing slurry as set forth in claim 21, the apparatus further comprising:

sensing means (96, 102) for sensing the flow of liquid which passes through the foraminous containers (14) of the first and last press assemblies (12); and control means (98) for operating the mixing and pressing means (16) in response to sensed flow rates.

23. The apparatus for extracting liquid from a liquid containing slurry as set forth in claim 21, the apparatus further comprising:

first sensing means (96) for sensing the flow of liquid which passes through the foraminous container (14) of the first press assembly (12);

second sensing means (102) for sensing the flow of liquid which passes through the foraminous container (14) of the last press assembly (12); and control means (98) for operating the mixing and pressing means (16) in response to sensed flow rates, the control means being responsive to first sensing means during initial start-up of the pressing apparatus, and the control means being responsive to the second sensing means after the initial start-up.

24. Apparatus for extracting liquid from a liquid containing slurry comprising:

a plurality of columns of sequentially interconnected press assemblies (12), each column including a first press assembly (12) and a last press assembly (12), each press assembly (12) having a foraminous container (14) having an inlet (26) and an outlet (28), and mixing and pressing means (16) mounted for movement within the foraminous container (14) for batch processing of slurry within the container (14) by sequentially mixing and pressing slurry within the foraminous container (14);

feed means (90) for continuously introducing slurry under pressure through the inlet (26) of the foraminous container (14) of each first press assembly (12) of each column to cause liquid within the slurry to be expressed through the foraminous container (14) of the first press assembly (12) of each column; and common manifold means (106) extending across the plurality of columns between the outlets (28) of the first foraminous cylinders and the inlets (26) of the subsequent foraminous cylinders, slurry from the first foraminous cylinders being discharged into the common manifold, and being subsequently delivered from the common manifold to subsequently positioned foraminous cylinders.

25. The apparatus for extracting liquid from a liquid containing slurry as set forth in claim 24 wherein control means (98) are provided for causing the mixing and pressing means (16) to press simultaneously.

* * * * *